(12) United States Patent
Böhm et al.

(10) Patent No.: US 7,718,738 B2
(45) Date of Patent: *May 18, 2010

(54) SELF ASSEMBLY OF MOLECULES TO FORM NANO-PARTICLES

(75) Inventors: Georg G. A. Böhm, Akron, OH (US);
Xiaorong Wang, Hudson, OH (US);
Chenchy Jeffrey Lin, Hudson, OH (US); James E. Hall, Mogadore, OH (US); Sandra Warren, Massillon, OH (US); James A. Krom, Belmont, MA (US); Hajime Kondo, Tokyo (JP);
Koichi Morita, Higashiyamato (JP)

(73) Assignee: Bridgestone Corporation (JP)

( * ) Notice: Subject to any disclaimer, the term of this patent is extended or adjusted under 35 U.S.C. 154(b) by 255 days.

This patent is subject to a terminal disclaimer.

(21) Appl. No.: 11/117,981

(22) Filed: Apr. 29, 2005

(65) Prior Publication Data

US 2006/0084722 A1    Apr. 20, 2006

Related U.S. Application Data

(63) Continuation-in-part of application No. 10/223,393, filed on Aug. 19, 2002, now Pat. No. 6,956,084, which is a continuation-in-part of application No. 09/970,830, filed on Oct. 4, 2001, now Pat. No. 6,437,050, and a continuation-in-part of application No. 10/038,748, filed on Dec. 31, 2001, now Pat. No. 6,689,469.

(51) Int. Cl.
*B32B 5/66* (2006.01)
*C08F 279/02* (2006.01)

(52) U.S. Cl. ............... 525/313; 525/314; 525/332.2; 525/332.9; 428/403; 428/407; 152/450

(58) Field of Classification Search ............ 525/313, 525/314, 333.2, 333.9; 428/403, 407; 152/450
See application file for complete search history.

(56) References Cited

U.S. PATENT DOCUMENTS

| | | | |
|---|---|---|---|
| 2,531,396 A | 11/1950 | Carter et al. |
| 3,598,884 A | 8/1971 | Wei |
| 3,793,402 A | 2/1974 | Owens |
| 3,840,620 A | 10/1974 | Gallagher |
| 3,972,963 A | 8/1976 | Schwab et al. |
| 4,075,186 A | 2/1978 | Ambrose et al. |
| 4,233,409 A | 11/1980 | Bulkley |
| 4,247,434 A | 1/1981 | Vanderhoff et al. |
| 4,248,986 A | 2/1981 | Lal et al. |
| 4,326,008 A | 4/1982 | Rembaum |
| 4,386,125 A | 5/1983 | Shiraki et al. |
| 4,463,129 A | 7/1984 | Shinada et al. |
| 4,471,093 A | 9/1984 | Furukawa et al. |
| 4,543,403 A | 9/1985 | Isayama et al. |
| 4,598,105 A | 7/1986 | Weber et al. |
| 4,602,052 A | 7/1986 | Weber et al. |
| 4,659,790 A | 4/1987 | Shimozato et al. |
| 4,717,655 A | 1/1988 | Fluwyler |
| 4,725,522 A | 2/1988 | Breton et al. |
| 4,764,572 A | 8/1988 | Bean, Jr. |
| 4,773,521 A | 9/1988 | Chen |
| 4,774,189 A | 9/1988 | Schwartz |
| 4,788,254 A | 11/1988 | Kawakubo et al. |
| 4,829,130 A | 5/1989 | Licchelli et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,904,732 A | 2/1990 | Iwahara et al. |
| 4,906,695 A | 3/1990 | Blizzard et al. |
| 4,920,160 A | 4/1990 | Chip et al. |
| 4,942,209 A | 7/1990 | Gunesin |
| 4,987,202 A | 1/1991 | Zeigler |
| 5,036,138 A | 7/1991 | Stamhuis et al. |
| 5,066,729 A | 11/1991 | Srayer, Jr. et al. |
| 5,073,498 A | 12/1991 | Schwartz et al. |
| 5,075,377 A | 12/1991 | Kawabuchi et al. |
| 5,120,379 A | 6/1992 | Noda et al. |
| 5,130,377 A | 7/1992 | Trepka et al. |
| 5,169,914 A | 12/1992 | Kaszas et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,296,547 A | 3/1994 | Nestegard et al. |
| 5,329,005 A | 7/1994 | Lawson et al. |

(Continued)

FOREIGN PATENT DOCUMENTS

CA    2127919    3/1995

(Continued)

OTHER PUBLICATIONS

Star Polymers by Immobilizing Function Block Copolymers, by Koji Ishizu, Tokyo Institute of Technology, Meguro-ku, Tokyo, Japan, *Star and Hyperbranched Polymers*, 1999, ISBN 0-8247-1986-7.

(Continued)

*Primary Examiner*—Robert D. Harlan
(74) *Attorney, Agent, or Firm*—Meredith E. Hooker; Nathan Lewis

(57) ABSTRACT

A polymer nano-particle composition is provided, wherein the nano-particle includes a poly(alkenylbenzene) core and a surface layer including poly(conjugated diene). A method for self-assembly of the nano-particles is also provided. The polymer nano-particles are preferably less than about 100 nm in diameter.

31 Claims, 1 Drawing Sheet

U.S. PATENT DOCUMENTS

| | | |
|---|---|---|
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,527,870 A | 6/1996 | Maeda et al. |
| 5,530,052 A | 6/1996 | Takekoshi et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,674,592 A | 10/1997 | Clark et al. |
| 5,686,528 A | 11/1997 | Wills et al. |
| 5,688,856 A | 11/1997 | Austgen, Jr. et al. |
| 5,707,439 A | 1/1998 | Takekoshi et al. |
| 5,728,791 A | 3/1998 | Tamai et al. |
| 5,733,975 A | 3/1998 | Aoyama et al. |
| 5,739,267 A | 4/1998 | Fujisawa et al. |
| 5,742,118 A | 4/1998 | Endo et al. |
| 5,747,152 A | 5/1998 | Oka et al. |
| 5,763,551 A | 6/1998 | Wünsch et al. |
| 5,773,521 A | 6/1998 | Hoxmeier et al. |
| 5,777,037 A | 7/1998 | Yamanaka et al. |
| 5,811,501 A | 9/1998 | Chiba et al. |
| 5,834,563 A | 11/1998 | Kimura et al. |
| 5,847,054 A | 12/1998 | McKee et al. |
| 5,848,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,905,116 A | 5/1999 | Wang et al. |
| 5,910,530 A | 6/1999 | Wang et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,127,488 A | 10/2000 | Obrecht et al. |
| 6,147,151 A | 11/2000 | Fukumoto et al. |
| 6,166,855 A | 12/2000 | Ikeyama et al. |
| 6,180,693 B1 | 1/2001 | Tang et al. |
| 6,191,217 B1 | 2/2001 | Wang et al. |
| 6,197,849 B1 | 3/2001 | Zilg et al. |
| 6,204,354 B1 | 3/2001 | Wang et al. |
| 6,207,263 B1 | 3/2001 | Takematsu et al. |
| 6,225,394 B1 | 5/2001 | Lan et al. |
| 6,252,014 B1 | 6/2001 | Knauss |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum et al. |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,420,486 B1 | 7/2002 | DePorter et al. |
| 6,437,050 B1 * | 8/2002 | Krom et al. ............. 525/313 |
| 6,441,090 B1 | 8/2002 | Demirors et al. |
| 6,448,353 B1 | 9/2002 | Nelson et al. |
| 6,489,378 B1 | 12/2002 | Sosa et al. |
| 6,524,595 B1 * | 2/2003 | Perrier et al. ............. 424/401 |
| 6,573,313 B2 | 6/2003 | Li et al. |
| 6,573,330 B1 | 6/2003 | Fujikake et al. |
| 6,598,645 B1 | 7/2003 | Larson |
| 6,649,702 B1 | 11/2003 | Rapoport et al. |
| 6,663,960 B1 | 12/2003 | Murakami et al. |
| 6,689,469 B2 * | 2/2004 | Wang et al. ............. 428/403 |
| 6,693,746 B1 | 2/2004 | Nakamura et al. |
| 6,706,813 B2 | 3/2004 | Chiba et al. |
| 6,706,823 B2 | 3/2004 | Wang et al. |
| 6,727,311 B2 | 4/2004 | Ajbani et al. |
| 6,737,486 B2 | 5/2004 | Wang |
| 6,750,297 B2 | 6/2004 | Yeu et al. |
| 6,759,464 B2 | 7/2004 | Ajbani et al. |
| 6,774,185 B2 | 8/2004 | Lin et al. |
| 6,777,500 B2 | 8/2004 | Lean et al. |
| 6,780,937 B2 | 8/2004 | Castner |
| 6,835,781 B2 | 12/2004 | Kondou et al. |
| 6,858,665 B2 | 2/2005 | Larson |
| 6,861,462 B2 | 3/2005 | Parker et al. |
| 6,872,785 B2 * | 3/2005 | Wang et al. ............. 525/313 |
| 6,875,818 B2 * | 4/2005 | Wang ............. 525/313 |
| 6,908,958 B2 | 6/2005 | Maruyama et al. |
| 6,956,084 B2 * | 10/2005 | Wang et al. ............. 525/313 |
| 7,056,840 B2 | 6/2006 | Miller et al. |
| 7,071,246 B2 | 7/2006 | Xie et al. |
| 7,112,369 B2 | 9/2006 | Wang et al. |
| 7,179,864 B2 | 2/2007 | Wang |
| 7,193,004 B2 | 3/2007 | Weydert et al. |
| 7,205,370 B2 | 4/2007 | Wang et al. |
| 7,217,775 B2 | 5/2007 | Castner |
| 7,238,751 B2 | 7/2007 | Wang et al. |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Heimrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang et al. |
| 2003/0130401 A1 | 7/2003 | Lin et al. |
| 2003/0149185 A1 | 8/2003 | Wang et al. |
| 2003/0198810 A1 | 10/2003 | Wang et al. |
| 2003/0225190 A1 | 12/2003 | Borbely et al. |
| 2004/0033345 A1 * | 2/2004 | Dubertret et al. ............. 428/220 |
| 2004/0059057 A1 | 3/2004 | Swisher et al. |
| 2004/0091546 A1 | 5/2004 | Johnson et al. |
| 2004/0127603 A1 | 7/2004 | Lean et al. |
| 2004/0143064 A1 | 7/2004 | Wang |
| 2004/0198917 A1 | 10/2004 | Castner |
| 2005/0101743 A1 | 5/2005 | Stacy et al. |
| 2005/0182158 A1 | 8/2005 | Ziser et al. |
| 2005/0192408 A1 | 9/2005 | Lin et al. |
| 2005/0197462 A1 | 9/2005 | Wang et al. |
| 2005/0203248 A1 | 9/2005 | Zheng et al. |
| 2005/0215693 A1 | 9/2005 | Wang et al. |
| 2005/0228072 A1 | 10/2005 | Winkler et al. |
| 2005/0228074 A1 | 10/2005 | Wang et al. |

| | | |
|---|---|---|
| 2005/0282956 A1 | 12/2005 | Bohm et al. |
| 2006/0173115 A1 | 8/2006 | Wang et al. |
| 2006/0173130 A1* | 8/2006 | Wang et al. ............... 525/63 |
| 2006/0235128 A1 | 10/2006 | Bohm et al. |
| 2007/0135579 A1 | 6/2007 | Obrecht et al. |
| 2007/0142550 A1 | 6/2007 | Wang et al. |
| 2007/0142559 A1 | 6/2007 | Wang et al. |
| 2007/0149649 A1 | 6/2007 | Wang et al. |
| 2007/0161754 A1 | 7/2007 | Wang et al. |
| 2007/0185273 A1 | 8/2007 | Hall et al. |
| 2007/0196653 A1 | 8/2007 | Hall et al. |
| 2008/0145660 A1 | 6/2008 | Wang et al. |
| 2008/0149238 A1 | 6/2008 | Kleckner et al. |
| 2008/0160305 A1 | 7/2008 | Wang et al. |
| 2008/0286374 A1 | 11/2008 | Wang et al. |
| 2008/0305336 A1 | 12/2008 | Wang et al. |
| 2009/0005491 A1 | 1/2009 | Warren et al. |
| 2009/0048390 A1 | 2/2009 | Wang et al. |
| 2009/0054554 A1 | 2/2009 | Wang et al. |
| 2009/0270558 A1 | 10/2009 | Gandon-Pain et al. |

FOREIGN PATENT DOCUMENTS

| | | |
|---|---|---|
| DE | 3434983 | 4/1986 |
| DE | 4241538 | 6/1994 |
| EP | 143500 | 6/1985 |
| EP | 0255170 | 2/1988 |
| EP | 0 265 142 A2 | 4/1988 |
| EP | 0 265 145 A2 * | 4/1988 |
| EP | 265142 | 4/1988 |
| EP | 0322905 | 7/1989 |
| EP | 0352042 | 1/1990 |
| EP | 0472344 | 2/1992 |
| EP | 0 540 942 A1 | 5/1993 |
| EP | 0 590 491 A2 | 4/1994 |
| EP | 0742268 | 11/1996 |
| EP | 1031605 | 8/2000 |
| EP | 1 099 728 A1 | 5/2001 |
| EP | 1 134 251 A1 | 9/2001 |
| EP | 1273616 | 1/2003 |
| EP | 1321489 | 6/2003 |
| EP | 1783168 | 5/2007 |
| FR | 2099645 | 3/1972 |
| JP | 01279943 | 1/1989 |
| JP | 2191619 | 7/1990 |
| JP | 2196893 | 8/1990 |
| JP | 05132605 | 5/1993 |
| JP | 06248017 | 9/1994 |
| JP | 7011043 | 1/1995 |
| JP | 08-199062 | 8/1996 |
| JP | 2000-514791 | 11/2000 |
| JP | 2003-0095640 | 4/2003 |
| JP | 2006-072283 | 3/2006 |
| JP | 2006-106596 | 4/2006 |
| JP | 2007-304409 | 11/2007 |
| WO | WO 91/04992 | 4/1991 |
| WO | 9704029 | 2/1997 |
| WO | 9853000 | 11/1998 |
| WO | WO 01/87999 A2 | 11/2000 |
| WO | 0075226 | 12/2000 |
| WO | WO 02/31002 A1 | 4/2002 |
| WO | WO 02/081233 | 10/2002 |
| WO | WO 02/100936 | 12/2002 |
| WO | 03032061 | 4/2003 |
| WO | WO 03/085040 | 10/2003 |
| WO | WO2004/058874 | 7/2004 |
| WO | 2006/069793 | 7/2006 |
| WO | 2008/079276 | 7/2008 |
| WO | 2008079807 | 7/2008 |
| WO | 2009/006434 | 1/2009 |

OTHER PUBLICATIONS

Star Polymers by Immobilizing Functional Block Copolymers, by Koji Ishizu, Tokyo Institute of Technology, Meguro-ku, Tokyo, Japan, Star and Hyperbranched Polymers, 1999, ISBN 0-8247-1986-7.

Formation of Worm-like Micelles from a Polystyrene-Polybutadiene-Polystyrene Block Copolymer in Ethyl Acetate, Canham et al., J.C.S. Faraday I, 1980, 76, 1857-1867.

Anomalous Behaviour of Solutions of Styrene-Butadiene Block Copolymers in Some Solvents, Tuzar et al., Makromol. Chem. 178, 22743-2746 (1977).

Association of Block Copolymers in Selective Solvents, 1 Measurements on Hydrogenated Poly(styrene-isoprene) in Decane and in trans-Decalin, Mandema et al., Makromol. Chem. 180, 1521-1538 (1979).

Light-Scattering Studies of a Polystyrene-Poly(methyl methacrylate) Two-Blcok Copolymer in Mixed Solvents, Utiyama et al. Macromolecules vol. 7, No. 4, Jul.-Aug. 1974.

Greenwod, N.N.; Eamshaw, A., Chemistry of the Elements, pp. 1126-1127, Pergaroen Press, New York 1984.

Kink-Block and Gauche-Block Structures of Bimolecular Films, Gehard Lagaly, Chem. Int. Ed. Engl. vol. 15 (1976) No. 10, pp. 575-586.

Linear Viscoelasticity of Disordered Polystyrene-Polyisoprene . . . Layered-Silicate Nanocomposites, J. Ren, Dept. of Chem Eng. Univ. of Houston, Macromol. 2000, pp. 3739-3746.

Rheology of End-Tethered Polymer Layered Silicate Nanocomposites, R. Krishnamoorti et al., Macromol. 1997, 30, 4097-4102.

Rheology of Nanocomposites Based on Layered Silicates and Polyamide-12, B. Hoffman et al., Colloid Polm. Sci. 278:629-636 (2000).

Quaternary Ammonium Compounds, Encyclopedia of Chem Tech., 4th Ed. vol. 20, 1996, Wiley & Sons, pp. 739-767.

Dendritic Macromolecules: Synthesis of Starburst Dendrimers, Donald A. Tomalia et al., Macromolecules vol. 19, No. 9, 1986, contribution from Functional Polymers/Processes and the Analytical Laboratory, Dow Chemical, Midland, MI 48640, pp. 2466-2468.

Preparation and Characterization of Heterophase Blends of Polycaprolactam and Hydrogenated Polydienes, David F. Lawson et al., pp. 2331-2351, Central Research Labs., The Firestone Tire and Rubber Col, Akron, OH 44317, Journal of Applied Polymer Science, vol. 39, 1990 John Willey & Sons, Inc.

R.P. Quirk and S.C. Gahan, Macromolecules, 34, 1192-1197 (2001).

M. Moller, J.P. Spaz, A. Roescher, S. Mobmer, S.T. Selvan, H.A. Klok, Macromol. Symp. 117, 207-218 (1997).

T. Cosgrove, J.S. Phipps, R.M. Richardson, Macromolecules. 26, 4363-4367 (1993).

S. Mossmer, J.P. Spatz, M.Moller, T. Aberle, J. Schmidt, W. Burchard, Macromol. 33, 4791-4798 (2000).

Functionalized Core Shell Polymers Prepared by Microemulsion Polymerization,E. Mendizabal, J.E. Pugl, A. Aguiar, S. Gonzalez-Villegas, 477/Antec '97/1733-1737.

Ultrahydrophobic and Ultrayophobic Surfaces: Some Comments and Examples, Wei Chen et al., The ACS Journal of Surfaces and Colloids, May 11, 1999, vol. 15, No. 10, pp. 3395-3399, Polymer Science and Engineering Dept., Univ. of MA, Amherst, MA 01003.

Super-Repellent Composite Fluoropolymer Surfaces, S.R. Coulson, I. Woodward, J.P.S. Badyal, The Journal of Physical Chemistry B, vol. 104, No. 37, Sep. 21, 2000. pp. 8836-8840, Dept. of Chemistry, Science Laboratories, Durham University, Durham, DH1 3LE, England, U.K.

Transformation of a Simple Plastic into a Superhydrophobic Surface, H. Yildirim Erbil et al., Science vol. 299, Feb. 28, 2003, pp. 1377-1380.

Reaction of Primary Aliphatic Amines with Maleic Anhydride, Lester E. Coleman et al., J. Org,. Chem., 24, 185, 1959, pp. 135-136.

Synthesis, Thermal Properties and Gas Permeability of Poly (N-n-alkylmaleimide)s, A. Matsumoto et al., Polymer Journal vol. 23, No. 3, 1991, pp. 201-209.

Simultaneous TA and MS Analysis of Alternating Styrene-Malei Anhydride and Styrene-Maleimide Copolymers, Thermochim. Acta, 277, 14, 1996.

Synthesis and Photocrosslinking of Maleimide-Type Polymers, Woo-Sik Kim et al., Macromol. Rapid Commun., 17, 835, 1996, pp. 835-841.

Polysulfobetaines and Corresponding Cationic Polymers. IV. Synthesis and Aqueous Solution Properties of Cationic Poly (MIQSDMAPM), Wen-Fu Lee et al., J. Appl. Pol. Sci. vol. 59, 1996, pp. 599-608.

Chemical Modification of Poly (styrene-co-maleic anhydride) with Primary N-Alkylamines by Reactive Extrusion, I Vermeesch et al., J. Applied Polym. Sci., vol. 53, 1994, pp. 1365-1373.

Vulcanization Agents and Auxiliary Materials, Kirk-Othmer, Encyclopedia of Chemical Technology, 3rd Ed., Wiley Interscience, NY, 1982, vol. 22, pp. 390-403.

Dialkylimidazolium Chloroaluminate Melts: A New Class of Room-Temperature Ionic Liquids for Electrochemistry, Spectroscopy, and Synthesis. J.S. Wilkes, J.A. Levisky, B.A. Wilson, lnorg. Chem. 1982, 21, pp. 1263-1264.

Polymer-m-Ionic-Liquid Electrolytes C. Tiyapiboonchaiya, D.R. MacFarlane, J. Sun, M. Forsyth, Micromol. Chem. Phys., 2002, 203, pp. 1906-1911.

EXAFS Investigations of the Mechanism of Facilitated Ion Transfer into a Room-Temperature Ionic Liquid. M. Jensen, J.A. Dzielawa, P. Rickert, M.L. Dietz, Jacs, 2002, 124, pp. 10664-10665.

Structure of molten 1,3-dimethylimidazolium chloride using neutron diffraction.C. Hardacre, J.D. Holbrey, S.E. J. McMath, D.T. Bowron, A.K. Soper, J. Chem. Physics, 2003, 118(1), pp. 273-278.

Reverse Atom Transfer Radical Polymerization of Methyl Methacrylate in Room-Temperature Inoic Liqquids, H. Ma, X. Wan, X. Chen, Q-F. Zhou, J. Polym. Sci., A. Polym. Chem. 2003, 41, pp. 143-151.

Non-Debye Relaxations in Disordered Ionic Solids, W. Dieterich, P. Maass, Chem. Chys. 2002, 284, pp. 439-467.

Polymer Layered Silicate Nanocomposites, Giannelis E.P. Advanced Materials vol. 8, No. 1, 1 Jan. 1996, pp. 29-35.

A Review of Nanocomposites 2000, J.N. Hay, S. J. Shaw.

Recent Advances in Flame Retardant Polymer Nanocomposites, Tilman, J.W. et al., pp. 273-283.

"Dendrimers and Dendrons, Concept, Synthesis, Application", edited by Newkome G.R, Wiley-VCH, 2001, pp. 45, 191-310.

"Synthesis, Functionalization and Surface Treatment of Nanoparticles", edited by Baraton M-I, ASP (Am. Sci. Pub.), Stevenson Ranch, California, 2003, pp. 51-52, 174-208.

Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).

Alexandridis, Paschalis et al., "Amphiphilic Block Copolymers: Self-Assembly and Applications", Elsevier Science B.V., pp. 1-435 (2000).

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Bahadur, Pratap, "Block copolymers- Their microdomain formation (in solid state) and surfactant behaviour (in solution)", Current Science, vol. 80, No. 8, pp. 1002-1007, Apr. 25, 2001.

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Bradley, John S., "The Chemistry of Transition Metal Colloids", Clusters and Colloids: From Theory to Applications, Chapter 6, Weinheim, VCH, pp. 459-544 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Calderara, Frederic et al., "Synthesis of chromophore-labelled polystyrene/poly(ethylene oxide) diblock copolymers", Makromol. Chem., 194, pp. 1411-1420 (1993).

Chen, Ming-Qing et al., "Graft Copolymers Having Hydrophobic Backbone and Hydrophilic Branches. XXIII. Particle Size Control of Poly(ethylene glycol)- Coated Polystyrene Nanoparticles Prepared by Macromonomer Method", Journal of Polymer Science: Part A: Polymer Chemistry, vol. 37, pp. 2155-2166 (1999).

Ege, Seyhan, Organic Chemistry Structure and Reactivity, 3rd Edition, p. 959, 1994.

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erhardt, Rainer et al., Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Guo, Andrew et al., "Star Polymers and Nanospheres from Cross-Linkable Diblock Copolymers", Macromolecules, vol. 29, pp. 2487-2493, Jan. 17, 1996.

Hamley, Ian W., "The Physics of Block Copolymers", Oxford Science Publication: Oxford, Chapters 3 and 4, pp. 131-265, (1998).

Ishizu, Koji et al., "Synthesis of Star Polymer with Nucleus of Microgel", Polymer Journal, vol. 12, No. 6, pp. 399-404 (1980).

Ishizu, Koji et al., "Core-Shell Type Polymer Microspheres Prepared from Block Copolymers", Journal of Polymer Science: Part C: Polymer Letters, vol. 26, pp. 281-286, 1988.

Ishizu, Koji, "Synthesis and Structural Ordering of Core-Shell Polymer Microspheres", Prog. Polym. Sci., vol. 23, pp. 1383-1408, 1998.

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Mayer, A.B.R. et al., "Transition metal nanoparticles protected by amphiphilic block copolymers as tailored catalyst systems", Colloid Polym. Sci., 275, pp. 333-340 (1997).

Mi, Yongli et al., "Glass transition of nano-sized single chain globules", Polymer 43, Elsevier Science Ltd., pp. 6701-6705 (2002).

Nace, Vaughn M., "Nonionic Surfactants: Polyoxyalkylene Block Copolymers", Surfactant Science Series, vol. 60, pp. 1-266 (1996).

O'Reilly, Rachel K. et al., "Cross-linked block copolymer micelles: functional nanostructures of great potential and versatility", Chem. Soc. Rev., vol. 35, pp. 1068-1083, Oct. 2, 2006.

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Oranli, Levent et al., "Hydrodynamic studies on micellar solutions of styrene-butadiene block copolymers in selective solvents", Can. J. Chem., vol. 63, pp. 2691-2696, 1985.

Piirma, Ida, "Polyineric Surfactants", Surfactant Science Series, vol. 42, pp. 1-289 (1992).

Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.

Price, Colin, "Colloidal Properties of Block Copolymers", Applied Science Publishers Ltd., Chapter 2, pp. 39-80 (1982).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Riess, Gerard et al., "Block Copolymers", Encyclopedia of Polymer Science and Engineering, vol. 2, pp. 324-434 (1985).

Riess, Gerard, "Micellization of block copolymers", Prog. Polym. Sci., vol. 28, pp. 1107-1170, Jan. 16, 2003.

Saito, Reiko et al., "Synthesis of microspheres with 'hairy-ball' structures from poly (styrene-b-2-vinyl pyridine) diblock copolymers", Polymer, vol. 33, No. 5, pp. 1073-1077, 1992.

Saito, Reiko et al., "Synthesis of Microspheres with Microphase-Separated Shells", Journal of Polymer Science: Part A: Polymer Chemistry, vol. 38, pp. 2091-2097 (2000).

Serizawa, Takeshi et al., "Transmission Electron Microscopic Study of Cross-Sectional Morphologies of Core-Corona Polymeric Nanospheres", Macromolecules, 33, pp. 1759-1764 (2000).

Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Thurmond, K. Bruce et al., "Shell cross-linked polymer micelles: stabilized assemblies with great versatility and potential", Colloids and Surfaces B: Biointerfaces, vol. 16, pp. 45-54, 1999.

Tsitsilianis, Constantinos et al., Makromol. Chem. 191, pp. 2319-2328 (1990).

Tuzar, Zdenek et al., "Micelles of Block and Graft Copolymers in Solutions", Surface and Colloid Science, vol. 15, Chapter 1, pp. 1-83 (1993).

Vamvakaki, M. et al., "Synthesis of novel block and statistical methacrylate-based ionomers containing acidic, basic or betaine residues", Polymer, vol. 39, No. 11, pp. 2331-2337 (1998).

van der Maarel, J.R.C. et al., "Salt-Induced Contraction of Polyelectrolyte Diblock Copolymer Micelles", Langmuir, vol. 16, No. 19, pp. 7510-7519 (2000).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Synthesis, Characterization, and Application of Novel Polymeric Nanoparticles", Macromolecules, 40, pp. 499-508 (2007).

Webber, Stephen E. et al., "Solvents and Self-Organization of Polymers", NATO ASI Series, Series E: Applied Sciences, vol. 327, pp. 1-509 (1996).

Wilson, D.J. et al., "Photochemical Stabilization of Block Copolymer Micelles", Eur. Polym. J., vol. 24, No. 7, pp. 617-621, 1988.

Wooley, Karen L, "From Dendrimers to Knedel-like Structures", Chem. Eur. J., 3, No. 9, pp. 1397-1399 (1997).

Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, D.J., "Anionic Copolymerization of Styrene with p-Divinylbenzene", Macromolecules, vol. 3, No. 5, pp. 514-517 (Sep.-Oct. 1970).

Zheng, Lei et al., "Polystyrene Nanoparticles with Anionically Polymerized Polybutadiene Brushes", Macromolecules, 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

Oct. 20, 2005 Office Action from U.S. Appl. No. 11/104,759, filed Apr. 13, 2005 (12 pp.).

Aug. 21, 2006 Final Office Action from U.S. Appl. No. 11/104,759, filed Apr. 13, 2005 (14 pp.).

Dec. 22, 2006 Advisory Action from U.S. Appl. No. 11/104,759, filed Apr. 13, 2005 (3 pp.).

May 16, 2007 Office Action from U.S. Appl. No. 11/104,759, filed Apr. 13, 2005 (9 pp.).

Oct. 30, 2007 Final Office Action from U.S. Appl. No. 11/104,759, filed Apr. 13, 2005 (11 pp.).

Braun, Hartmut et al., "Enthalpic interaction of diblock copolymers with immiscible polymer blend components", Polymer Bulletin, vol. 32, pp. 241-248 (1994).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).

Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).

Ferreira, Paula G. et al., "Scaling Law for Entropic Effects at Interfaces between Grafted Layers and Polymer Melts", Macromolecules, vol. 31, pp. 3994-4003 (1998).

Gay, C., "Wetting of a Polymer Brush by a Chemically Identical Polymer Melt", Macromolecules, vol. 30, pp. 5939-5943 (1997).

Halperin, A., "Polymeric Micelles: A Star Model", Macromolecules, vol. 20, pp. 2943-2946 (1987).

Hasegawa, Ryuichi et al., "Optimum Graft Density for Dispersing Particles in Polymer Melts", Macromolecules, vol. 29, pp. 6656-6662 (1996).

Kraus, Gerard, "Mechanical Losses in Carbon-Black-Filled Rubbers", Journal of Applied Polymer Science: Applied Polymer Symposium, vol. 39, pp. 75-92 (1984).

Ligoure, Christian, "Adhesion between a Polymer Brush and an Elastomer: A Self-Consistent Mean Field Model", Macromolecules, vol. 29, pp. 5459-5468 (1996).

Matsen, M.W., "Phase Behavior of Block Copolymer/Homopolymer Blends", Macromolecules, vol. 28, pp. 5765-5773 (1995).

Milner, S.T. et al., "Theory of the Grafted Polymer Brush", Macromolecules, vol. 21, pp. 2610-2619 (1988).

Milner, S.T. et al., "End-Confined Polymers: Corrections to the Newtonian Limit", Macromolecules, vol. 22, pp. 489-490 (1989).

Noolandi, Jaan et al., "Theory of Block Copolymer Micelles in Solution", Macromolecules, vol. 16, pp. 1443-1448 (1983).

Semenov, A.N., "Theory of Diblock-Copolymer Segregation to the Interface and Free Surface of a Homopolymer Layer", Macromolecules, vol. 25, pp. 4967-4977 (1992).

Semenov, A.N., "Phase Equilibria in Block Copolymer-Homopolymer Mixtures", Macromolecules, vol. 26, pp. 2273-2281 (1993).

Shull, Kenneth R., "End-Adsorbed Polymer Brushes in High- and Low-Molecular-Weight Matrices", Macromolecules, vol. 29, pp. 2659-2666 (1996).

Whitmore, Mark Douglas et al., "Theory of Micelle Formation in Block Copolymer-Homopolymer Blends", Macromolecules, vol. 18, pp. 657-665 (1985).

Wijmans, C.M. et al., "Effect of Free Polymer on the Structure of a Polymer Brush and Interaction between Two Polymer Brushes", Macromolecules, vol. 27, pp. 3238-3248 (1994).

Witten, T.A. et al., "Stress Relaxation in the Lamellar Copolymer Mesophase", Macromolecules, vol. 23, pp. 824-829 (1990).

Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

Ishizu, Koji et al., "Preparation of core-shell type polymer microspheres from anionic block copolymers", Polymer, vol. 34, No. 18, pp. 3929-3933 (1993).

Kralik, M. et al., "Catalysis by metal nanoparticles supported on functional organic polymers", Journal of Molecular Catalysis A: Chemical, vol. 177, pp. 113-138 [2001].

Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).

Saito, Reiko et al., "Arm-number effect of core-shell type polymer microsphere: 1. Control of arm-number of microsphere", Polymer, vol. 35, No. 4, pp. 866-871 (1994).

Wang, Xiaorong et al., U.S. Appl. No. 10/791,049, filed Mar. 2, 2004 entitled "Method Of Making Nano-Particles of Selected Size Distribution".

Wang, Xiaorong et al., U.S. Appl. No. 10/791,177, filed Mar. 2, 2004 entitled "Rubber Composition Containing Functionalized Polymer Nanoparticles".

Wang, Xiaorong et al., U.S. Appl. No. 10/872,731, filed Jun. 21, 2004 entitled "Reversible Polymer/Metal Nano-Composites And Method For Manufacturing Same".

Wang, Xiaorong et al., U.S. Appl. No. 10/886,283, filed Jul. 6, 2004 entitled "Hydropobic Surfaces with Nanoparticles".

Wang, Xiaorong et al., U.S. Appl. No. 11/058,156, filed Feb. 15, 2005 entitled "Multi-Layer Nano-Particle Preparation And Applications".

Wang, Xiaorong et al., U.S. Appl. No. 11/104,759, filed Apr. 13, 2005 entitled "Nano-Particle Preparation And Applications".

Wang, Xiaorong et al., U.S. Appl. No. 11/305,279, filed Dec. 16, 2005 entitled "Combined Use Of Liquid Polymer And Polymeric Nanoparticles For Rubber Applications".

Wang, Xiaorong et al., U.S. Appl. No. 11/344,861, filed Feb. 1, 2006 entitled "Nano-Composite And Compositions Therefrom".

Wang, Xiaorong et al., U.S. Appl. No. 11/642,796 filed Dec. 20, 2006 entitled "Hollow Nano-Particles And Method Thereof".

Wang, Xiaorong et al., U.S. Appl. No. 11/764,607, filed Jun. 18, 2007 entitled "Multi-Layer Nano-Particle Preparation and Applications".

Warren, Sandra, U.S. Appl. No. 11/771,659, filed Jun. 29, 2007 entitled "One-Pot Synthesis Of Nanoparticles And Liquid Polymer For Rubber Applications".

Wang, Xiaorong et al., U.S. Appl. No. 11/941,128, filed Nov. 16, 2007 entitled "Nano-Particle Preparation And Applications".

Bohm, Georg et al., "Emerging materials: technology for new tires and other rubber products", Tire Technology International, 2006 (4 pp.).

Borukhov, Itamar et al., "Enthalpic Stabilization of Brush-Coated Particles in a Polymer Melt", Macromolecules, vol. 35, pp. 5171-5182 (2002).

Cui, Honggang et al., "Block Copolymer Assembly via Kinetic Control", Science, vol. 317, pp. 647-650 (Aug. 3, 2007).

Edmonds, William F. et al., "Disk Micelles from Nonionic Coil- Coil Diblock Copolymers", Macromolecules, vol. 39, pp. 4526-4530 (May 28, 2006).

O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).

Wang, Xiaorong et al., "Strain-induced nonlinearity of filled rubbers", Physical Review E 72, 031406, pp. 1-9 (Sep. 20, 2005).

Pre-print article, Wang, Xiaorong et al., "PMSE 392- Manufacture and Commercial Uses of Polymeric Nanoparticles", Division of Polymeric Materials: Science and Engineering (Mar. 2006).

Wang, Xiaorong et al., "Manufacture and Commercial Uses of Polymeric Nanoparticles", Polymeric Materials: Science and Engineering, vol. 94, p. 659 (2006).

Wang, Xr. et al., "Fluctuations and critical phenomena of a filled elastomer under deformation", Europhysics Letters, vol. 75, No. 4, pp. 590-596 (Aug. 15, 2006).

Wang, Xiaorong et al., "Under microscopes the poly(styrene/butadiene) nanoparticles", Journal of Electron Microscopy, vol. 56, No. 6, pp. 209-216 (2007).

Wang, Xiaorong et al., "Heterogeneity of structural relaxation in a particle-suspension system", EPL, 79, 18001, pp. 1-5 (Jul. 2007).

Bridgestone Americas 2006 Presentation (14 pp.).

Sakurai, Ryo et al., "68.2: Color and Flexible Electronic Paper Display using QR-LPD Technology", SID 06 Digest, pp. 1922-1925 (2006).

Asinovsky, Olga, Jun. 20, 2006 Office Action from U.S. Appl. No. 10/791,049, filed Mar. 2, 2004 (11 pp.).

Asinovsky, Olga, Dec. 22, 2006 Office Action from U.S. Appl. No. 10/791,049, filed Mar. 2, 2004 (11 pp.).

Asinovsky, Olga, Jun. 7, 2007 Office Action from U.S. Appl. No. 10/791,049, filed Mar. 2, 2004 (11 pp.).

Asinovsky, Olga, Nov. 28, 2007 Office Action from U.S. Appl. No. 10/791,049, filed Mar. 2, 2004 (9 pp.).

Asinovsky, Olga, May 21, 2008 Office Action from U.S. Appl. No. 10/791,049, filed Mar. 2, 2004 (11 pp.).

Asinovsky, Olga, Sep. 11, 2008 Office Action from U.S. Appl. No. 10/791,049, filed Mar. 2, 2004 (12 pp.).

Ronesi, Vickey M., Jan. 8, 2007 Office Action from U.S. Appl. No. 10/791,177, filed Mar. 2, 2004 (5 pp.).

Harlan, Robert D., May 3, 2007 Office Action from U.S. Appl. No. 10/791,177, filed Mar. 2, 2004 (6 pp.).

Harlan, Robert D., Oct. 18, 2007 Office Action from U.S. Appl. No. 10/791,177, filed Mar. 2, 2004 (6 pp.).

Harlan, Robert D., May 28, 2008 Office Action from U.S. Appl. No. 10/791,177, filed Mar. 2, 2004 (8 pp.).

Kiliman, Leszek B., Sep. 9, 2005 Office Action from U.S. Appl. No. 10/817,995, filed Apr. 5, 2004 (7 pp.).

Kiliman, Leszek B., Mar. 23, 2006 Office Action from U.S. Appl. No. 10/817,995, filed Apr. 5, 2004 (7 pp.).

Kiliman, Leszek B., Dec. 13, 2006 Office Action from U.S. Appl. No. 10/817,995, filed Apr. 5, 2004 (6 pp.).

Kiliman, Leszek B., Sep. 5, 2008 Office Action from U.S. Appl. No. 10/817,995, filed Apr. 5, 2004 (5 pp.).

Wyrozebski Lee, Katarzyna I., Dec. 19, 2006 Office Action from U.S. Appl. No. 10/872,731, filed Jun. 21, 2004 (6 pp.).

Wyrozebski Lee, Katarzyna I., Mar. 7, 2007 Office Action from U.S. Appl. No. 10/872,731, filed Jun. 21, 2004 (13 pp.).

Wyrozebski Lee, Katarzyna I., Sep. 14, 2007 Office Action from U.S. Appl. No. 10/872,731, filed Jun. 21, 2004 (9 pp.).

Chevalier, Alicia Ann, Sep. 6, 2006 Office Action from U.S. Appl. No. 10/886,283, filed Jul. 6, 2004 (5 pp.).

Chevalier, Alicia Ann, Jan. 4, 2007 Office Action from U.S. Appl. No. 10/886,283, filed Jul. 6, 2004 (8 pp.).

Chevalier, Alicia Ann, Jul. 2, 2007 Office Action from U.S. Appl. No. 10/886,283, filed Jul. 6, 2004 (8 pp.).

Chevalier, Alicia Ann, Jan. 4, 2008 Office Action from U.S. Appl. No. 10/886,283, filed Jul. 6, 2004 (8 pp.).

Mullis, Jeffrey C., Oct. 31, 2006 Office Action from U.S. Appl. No. 11/050,115, filed Feb. 3, 2005 (6 pp.).

Mullis, Jeffrey C., Mar. 24, 2008 Office Action from U.S. Appl. No. 11/050,115, filed Feb. 3, 2005 (10 pp.).

Mullis, Jeffrey C., Aug. 21, 2008 Office Action from U.S. Appl. No. 11/050,115, filed Feb. 3, 2005 (7 pp.).

Lipman, Bernard., Sep. 29, 2006 Office Action from U.S. Appl. No. 11/058,156, filed Feb. 15, 2005 (5 pp.).

Raza, Saira B., Oct. 20, 2005 Office Action from U.S. Appl. No. 11/104,759, filed Apr. 13. 2005 (10 pp.).

Raza, Saira B., Aug. 21, 2006 Office Action from U.S. Appl. No. 11/104,759, filed Apr. 13. 2005 (6 pp.).

Haider, Saira Bano, May 16, 2007 Office Action from U.S. Appl. No. 11/104,759, filed Apr. 13. 2005 (9 pp.).

Haider, Saira Bano, Oct. 30, 2007 Office Action from U.S. Appl. No. 11/104,759, filed Apr. 13. 2005 (9 pp.).

Haider, Saira Bano, Jun. 12, 2008 Office Action from U.S. Appl. No. 11/104,759, filed Apr. 13. 2005 (10 pp.).

Maksymonko, John M., Feb. 20, 2008 Office Action from U.S. Appl. No. 11/305,279, filed Dec. 16, 2005 (14 pp.).

Maksymonko, John M., Aug. 6, 2008 Office Action from U.S. Appl. No. 11/305,279, filed Dec. 16, 2005 (11 pp.).

Maksymonko, John M., Jul. 17, 2008 Office Action from U.S. Appl. No. 11/305,281, filed Dec. 16, 2005 (13 pp.).
Le, Hoa T., Sep. 25, 2008 Office Action from U.S. Appl. No. 11/612,554, filed Dec. 19, 2006 (8 pp.).
Maksymonko, John M., Jun. 13, 2008 Office Action from U.S. Appl. No. 11/641,514, filed Dec. 19, 2006 (7 pp.).
Mullis, Jeffrey C., Oct. 31, 2008 Office Action from U.S. Appl. No. 11/641,514, filed Dec. 19, 2006 (10 pp.).
Maksymonko, John M., Jun. 11, 2008 Office Action from U.S. Appl. No. 11/642,124, filed Dec. 20, 2006 (16 pp.).
Maksymonko, John M., May 30, 2008 Office Action from U.S. Appl. No. 11/642,795, filed Dec. 20, 2006 (12 pp.).
Maksymonko, John M., May 28, 2008 Office Action from U.S. Appl. No. 11/642,802, filed Dec. 20, 2006 (10 pp.).
Chen, Jizhuang, Dec. 30, 2005 Office Action from Chinese Patent Application No. 02819527.2 filed Oct. 4, 2002 (9 pp.).
Chen, Jizhuang, Dec. 21, 2007 Office Action from Chinese Patent Application No. 02819527.2 filed Oct. 4, 2002 (12 pp.).
Chen, Jizhuang, Sep. 26, 2008 Office Action from Chinese Patent Application No. 02819527.2 filed Oct. 4, 2002 (4 pp.).
Schutte, M., Aug. 8, 2006 Office Action from European Patent Application No. 02807196.7 filed Oct. 4, 2002 (5 pp.).
Schutte, Maya, Sep. 3, 2007 Office Action from European Patent Application No. 02807196.7 filed Oct. 4, 2002 (2 pp.).
Watanabe, Y., May 7, 2008 Office Action from Japanese Patent Application No. 582224/2003 filed Oct. 4, 2002 (5 pp.).
Watanabe, Y., Jul. 29, 2008 Office Action from Japanese Patent Application No. 582224/2003 filed Oct. 4, 2002 (17 pp.).
May 30, 2008 International Search Report from PCT Patent Application No. PCT/US2007/026031 filed Dec. 19, 2007 (4 pp.).
May 27, 2008 International Search Report from PCT Patent Application No. PCT/US2007/087869 filed Dec. 18, 2007 (4 pp.).
Aug. 25, 2008 International Search Report from PCT Patent Application No. PCT/US2008/068838 filed Jun. 30, 2008 (4 pp.).
Haider, Saira Bano, Mar. 19, 2008 Advisory Action from U.S. Appl. No. 11/104,759, filed Apr. 13, 2005 (3 pp.).
Haider, Saira Bano, Dec. 2, 2008 Office Action from U.S. Appl. No. 11/104,759, filed Apr. 13, 2005 (10 pp.).
Lipman, Bernard, Sep. 14, 2006 Office Action from U.S. Appl. No. 11/168,297, filed Jun. 29, 2005 (4 pp.).
Lipman, Bernard, Mar. 2, 2007 Notice of Allowance from U.S. Appl. No. 11/168,297, filed Jun. 29, 2005 (3 pp.).
Lipman, Bernard, Apr. 18, 2007 Supplemental Notice of Allowability from U.S. Appl. No. 11/168,297, filed Jun. 29, 2005 (3 pp.).
Lipman, Bernard, Mar. 20, 2008 Office Action from U.S. Appl. No. 11/764,607, filed Jun. 18, 2007 (4 pp.).
Lipman, Bernard, Sep. 25, 2008 Notice of Allowance from U.S. Appl. No. 11/764,607, filed Jun. 18, 2007 (3 pp.).
Russell, Graham, Nov. 4, 2008 Office Action from European Patent Application No. 05742316.2 filed Mar. 28, 2005 (2 pp.).
Schutte, M., Nov. 13, 2003 International Search Report from PCT Patent Application No. PCT/US02/31817 filed Oct. 4, 2002 (3 pp.).
Schutte, M., May 28, 2004 International Search Report from PCT Patent Application No. PCT/US03/40375 filed Dec. 18, 2003 (3 pp.).
Iraegui Retolaza, E., Jul. 9, 2004 InternationalSearch Report from PCT Patent Application No. PCT/US2004/001000 filed Jan. 15, 2004 (3 pp.).
Russell, G., Aug. I, 2005 International Search Report from PCT Patent Application No. PCT/US2005/010352 filed Mar. 28, 2005 (3 pp.).
Mettler, Rolf-Martin, May 27, 2008 International Search Report from PCT Patent Application No. PCT/US2007/087869 filed Dec. 18, 2007 (2 pp.).
Iraegui Retolaza, E., May 30, 2008 International Search Report from PCT Patent Application No. PCT/US2007/02603 I filed Dec. 19, 2007 (3 pp.).
Harlan, Robert D., Final Office Action dated Dec. 10, 2008 from U.S. Appl. No. 10/791,177 (8 pp.).
Cain, Edward J., Final Office Action dated Dec. 9, 2008 from U.S. Appl. No. 11/642,795 (6 pp.).
Mulcahy, Peter D., Restriction/Election Office Action dated Dec. 11, 2008 from U.S. Appl. No. 11/642,802 (7 pp.).

Lipman, Bernard, Notice of Allowance dated Jan. 14, 2009 from U.S. Appl. No. 11/058,156 (5 pp.).
Cain, Edward J., Notice of Allowance dated Dec. 31, 2008 from U.S. Appl. No. 11/642,124 (5 pp.).
Lipman, Bernard, Notice of Allowance dated Jan. 27, 2009 from U.S. Appl. No. 11/764,607 (4 pp.).
Johnson, Edward M., International Search Report dated Dec. 12, 2008 from PCT Application No. PCT/US07/74611 (5 pp.).
Wang, Xiaorong et al., U.S. Appl. No. 12/374,883, filed Jul. 27, 2007, entitled "Polymeric Core-Shell Nanoparticles with Interphase Region".
Haider, Saira Bano, Mar. 3, 2009 Advisory Action from U.S. Appl. No. 11/104,759 (3 pp.).
Mullis, Jeffrey C., Mar. 11, 2009 Office Action from U.S. Appl. No. 10/791,049 (9 pp.).
Harlan, Robert D., Mar. 11, 2009 Notice of Allowance from U.S. Appl. No. 10/791,177 (8 pp.).
Sykes, Altrev C., Mar. 20, 2009 Office Action from U.S. Appl. No. 11/818,023 (27 pp.).
Pak, Hannah J., Apr. 2, 2009 Office Action from U.S. Appl. No. 11/941,128 (9 pp.).
Mullis, Jeffrey C., Apr. 30, 2009 Final Office Action from U.S. Appl. No. 11/641,514 (11 pp.).
Mulcahy, Peter D., May 13, 2009 Office Action from U.S. Appl. No. 11/642,802 (7 pp.).
Peets, Monique R., May 11, 2009 Restriction/Election Office Action from U.S. Appl. No. 11/697,801 (6 pp.).
Mullis, Jeffrey C., May 19, 2009 Advisory Action from U.S. Appl. No. 10/791,049 (5 pp.).
Zemel, Irina Sopja, Office Action dated May 28, 2009 from U.S. Appl. No. 11/305,279 (7 pp.).
Mullis, Jeffrey C., Jul. 15, 2009 Advisory Action from U.S. Appl. No. 11/641,514 (4 pp.).
Peets, Monique R., Jul. 20, 2009 Office Action from U.S. Appl. No. 11/697,801 (9 pp.).
Haider, Saira Bano, Sep. 11, 2009 Examiner's Answer from U.S. Appl. No. 11/104,759 (9 pp.).
Sykes, Altrev C., Oct. 16, 2009 Office Action from U.S. Appl. No. 11/818,023 [20 pp.].
Mullis, Jeffrey C., Nov. 9, 2009 Office Action from U.S. Appl. No. 11/641,514 [9 pp.].
Mulcahy, Peter D., Nov. 9, 2009 Final Office Action from U.S. Appl. No. 11/642,802 [6 pp.].
Kiliman, Leszek B., Nov. 13, 2009 Office Action from U.S. Appl. No. 10/817,995 [6 pp.].
Lipman, Bernard, Mar. 26, 2002 Notice of Allowance from U.S. Appl. No. 09/970,830, filed Oct. 4, 2001 (4 pp.).
Kiliman, Leszek B., Feb. 13, 2003 Office from U.S. Appl. No. 10/038,748, filed Dec. 31, 2001 (3 pp.).
Kiliman, Leszak B., Aug. 25, 2003 Notice of Allowance from U.S. Appl. No. 10/038,748, filed Dec. 31, 2001 (5 pp.).
Harlan, Robert D., Mar. 17, 2004 Restriction/Election Office Action from U.S. Appl. No. 10/223,393, filed Aug. 19, 2002 (6 pp.).
Harlan, Robert D., Jun. 22, 2004 Office Action from U.S. Appl. No. 10/223,393, filed Aug. 19, 2002 (6 pp.).
Harlan, Robert D., Jan. 3, 2005 Notice of Allowance from U.S. Appl. No. 10/223,393, filed Aug. 19, 2002 (6 pp.).
Lipman, Bernard, Mar. 25, 2004 Restriction/Election Office Action from U.S. Appl. No. 10/331,841, filed Dec. 30, 2002 (6 pp.).
Lipman, Bernard, Nov. 18, 2004 Notice of Allowance from U.S. Appl. No. 10/331,841, filed Dec. 30, 2002 (5 pp.).
Lipman, Bernard, Mar. 24, 2004 Restriction/Election Office Action from U.S. Appl. No. 10/345,498, filed Jan. 16, 2003 (5 pp.).
Lipman, Bernard, Nov. 23, 2004 Notice of Allowance from U.S. Appl. No. 10/345,498, filed Jan. 16, 2003 (5 pp.).
Choi, Ling Siu, Mar. 24, 2006 Office Action from U.S. Appl. No. 10/755,648, filed Jan. 12, 2004 (11 pp.).
Choi, Ling Siu, Dec. 4, 2006 Notice of Allowance from U.S. Appl. No. 10/755,648, filed Jan. 12, 2004 (9 pp.).
Asinovsky, Olga, Aug. 16, 2007 Advisory Action from U.S. Appl. No. 10/791,049, filed Mar. 2, 2004 (2 pp.).
Asinovsky, Olga, Jul. 29, 2008 Advisory Action from U.S. Appl. No. 10/791,049, filed Mar. 2, 2004 (3 pp.).

Harlan, Robert D., Jan. 9, 2008 Advisory Action from U.S. Appl. No. 10/791,177, filed Mar. 2, 2004 (3 pp.).
Harlan, Robert D., Mar. 7, 2008 Advisory Action from U.S. Appl. No. 10/791,177, filed Mar. 2, 2004 (3 pp.).
Le, Hoa T., Dec. 14, 2004 Office Action from U.S. Appl. No. 10/791,491, filed Mar. 2, 2004 (5 pp.).
Le, Hoa T., Jul. 5, 2005 Office Action from U.S. Appl. No. 10/791,491, filed Mar. 2, 2004 (9 pp.).
Le, Hoa T., Apr. 10, 2006 Notice of Allowance from U.S. Appl. No. 10/791,491, filed Mar. 2, 2004 (5 pp.).
Kiliman, Leszak B., May 15, 2007 Advisory ACtion from U.S. Appl. No. 10/817,995, filed Apr. 5, 2004 (2 pp.).
Kiliman, Leszak B., Apr. 2, 2008 Notice of Allowance from U.S. Appl. No. 10/817,995, filed Apr. 5, 2004 (5 pp.).
Mullis, Jeffrey C., Nov. 5, 2008 Advisory Action from U.S. Appl. No. 11/050,115, filed Feb. 3, 2005 (4 pp.).
Lipman, Bernard, May 21, 2007 Notice of Allowance from U.S. Appl. No. 11/058,156, filed Feb. 15, 2005 (3 pp.).
Lipman, Bernard, Aug. 28, 2007 Notice of Allowance from U.S. Appl. No. 11/058,156, filed Feb. 15, 2005 (5 pp.).
Lipman, Bernard, Feb. 28, 2008 Notice of Allowance from U.S. Appl. No. 11/058,156, filed Feb. 15, 2005 (5 pp.).
Lipman, Bernard, May 29, 2008 Notice of Allowance from U.S. Appl. No. 11/058,156, filed Feb. 15, 2005 (5 pp.).
Lipman, Bernard, Oct. 3, 2006 Notice of Allowance from U.S. Appl. No. 11/064,234, filed Feb. 22, 2005 (5 pp.).
Haider, Saira Bano, Dec. 22, 2006 Advisory Action from U.S. Appl. No. 11/104,759, filed Apr. 13, 2005 (3 pp.).
An article entitled "Functionalized Core-Shell Polymers Prepared by Microemulsion Polymerization" E. Mendlzahal, et al. Dept. of Ingenieria Quimica, Univ. de Guadadalars, MX, 477/ANTE 97/1733-1737, 1997.
Chevalier, Alicia Ann, Nov. 25, 2009 Office Action from U.S. Patent Appl. No. 10/886,283 [7 pp.].
Zemel, Irina Sopja, Dec. 3, 2009 Final Office Action from U.S. Appl. No. 11/305,279 [10 pp.].
Mullis, Jeffrey C., Dec. 18, 2009 Supplemental Notice of Allowability from U.S. Appl. No. 11/050,115 [2 pp.].
Harlan, Robert D., Dec. 29, 2009 Notice of Allowance from U.S. Patent Appl. No. 10/791,177 [6 pp.].
Peets, Monique R., Jan. 5, 2010 Final Office Action from U.S. Patent Appl. No. 11/697,801 [9 pp.].
Pak, Hannah J., Jan. 6, 2010 Final Office Action from U.S. Appl. No. 11/941,128 [10 pp.].

* cited by examiner

SELF ASSEMBLY OF MOLECULES TO FORM NANO-PARTICLES

This is a continuation-in-part of U.S. application Ser. No. 10/223,393, filed Aug. 19, 2002 now U.S. Pat. No. 6,956,084 that is published as U.S. patent application No. 20030198810, that is a continuation-in-part application of U.S. application Ser. No. 09/970,830 filed Oct. 4, 2001 that issued as U.S. Pat. No. 6,437,050, and application Ser. No. 10/038,748 filed Dec. 31, 2001 that issued as U.S. Pat. No. 6,689,469.

BACKGROUND OF THE INVENTION

The present invention relates to polymer nano-particles, a method for their preparation, and their use as, for example, additives for rubber, including natural and synthetic elastomers.

Polymer nano-particles have attracted increased attention over the past several years in a variety of fields including catalysis, combinatorial chemistry, protein supports, magnets, and photonic crystals. Similarly, vinyl aromatic (e.g. polystyrene) microparticles have been prepared for uses as a reference standard in the calibration of various instruments, in medical research and in medical diagnostic tests. Such polystyrene microparticles have been prepared by anionic dispersion polymerization.

Nano-particles can be discrete particles uniformly dispersed throughout a host composition. Nano-particles may be monodisperse in size and uniform in shape. However, controlling the size of nano-particles during polymerization and/or the surface characteristics of such nano-particles can be difficult. Moreover, achieving better control over the surface composition of such polymer nano-particles also is desirable.

Rubbers may be modified by the addition of various polymer compositions. Such polymeric additives often improve the physical properties of rubber compositions. Specifically, moldability and tenacity are often improved through such modifications.

Development of nano-particles having a poly(conjugated diene) surface layer which would be compatible with a wide variety of rubbers is desirable because discrete particles could likely disperse evenly throughout the rubber to provide a uniform rubber composition. However, the solubility of diene monomers in traditional alkane solvents has made solution polymerization a difficult process by which to achieve conjugated diene nano-particles.

SUMMARY OF THE INVENTION

A polymer nano-particle composition is provided. The nano-particle includes a crosslinked poly(alkenylbenzene) core and a surface layer including poly(conjugated diene). The mean average diameter of such polymer nano-particles is preferably less than about 100 nm.

In one embodiment, the method for forming polymer nano-particles includes self assembly of a plurality of polymer chains into one or more nano-particles. The mean average diameter of the nano-particles is no more than about 100 nm.

In another embodiment, a rubber composition is formed, wherein the above-described nano-particles are combined with at least one rubber to form a modified rubber composition with improved tensile and/or tear strength.

Herein throughout, unless specifically stated otherwise:
"vinyl-substituted aromatic hydrocarbon" and "alkenylbenzene" are used interchangeably; and
"rubber" refers to rubber compounds, including natural rubber, and synthetic elastomers including styrene-butadiene rubber, ethylene propylene rubber, etc., which are known in the art.

DETAILED DESCRIPTION OF ILLUSTRATIVE EMBODIMENTS

Figure 1:
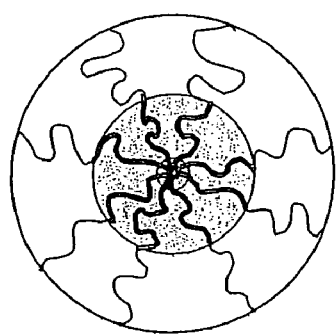
FIG. 1 is a nano-particle of the present invention in spherical shape.

In one embodiment the polymer nano-particle is formed from diblock polymer chains having a poly(conjugated diene) block and a poly(alkenylbenzene) block. The poly(alkenylbenzene) blocks are crosslinked to form the desired nano-particles. The nano-particles have diameters—expressed as a mean average diameter—that are preferably less than about 100 nm, more preferably less than about 75 nm, and most preferably less than about 50 nm. The nano-particles preferably are substantially monodisperse and uniform in shape. The dispersity is represented by the ratio of $M_w$ to $M_n$, with a ratio of 1 being substantially monodisperse. The polymer nano-particles of the present invention preferably have a dispersity less than about 1.3, more preferably less than about 1.1. Moreover, the nano-particles are preferably spherical, though shape defects are acceptable, provided the nano-particles generally retain their discrete nature with little or no polymerization between particles.

The nano-particles are preferably formed via dispersion polymerization, although emulsion polymerization is also contemplated. Hydrocarbons are preferably used as the dispersion solvent. Suitable solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane and the like. These hydrocarbons may be used individually or in combination.

With respect to the monomers and solvents identified herein, nano-particles are formed by maintaining a temperature that is favorable to polymerization of the selected monomers in the selected solvent(s). Preferred temperatures are in the range of about −40 to 250° C., with a temperature in the range of about 0 to 150° C. being particularly preferred. As described in more detail below, the interaction of monomer selection, temperature and solvent, facilitates the formation of diblock polymers which form micelles and ultimately the desired nano-particles.

According to an embodiment of the invention, a first diblock polymer is formed of vinyl aromatic hydrocarbon monomers and conjugated diene monomers in the hydrocarbon solvent. The diblock polymer contains a first end block that is soluble in the dispersion solvent, preferably the conjugated diene monomer, and a second end block which is less soluble in the dispersion solvent, preferably the vinyl-substituted aromatic hydrocarbon monomer. Moreover, in one preferred embodiment, a vinyl-substituted aromatic hydrocarbon monomer is chosen which is insoluble in the dispersion solvent.

As is known in the art, such a diblock copolymer may be formed by living anionic polymerization, in which the vinyl-substituted aromatic hydrocarbon monomer is added to the completely polymerized conjugated diene monomer. Another method of forming substantially diblock polymers is the living anionic copolymerization of a mixture of a conjugated diene monomer and a vinyl-substituted aromatic hydrocarbon monomer in a hydrocarbon solvent, particularly, in the absence of certain polar additives, such as ethers, tertiary amines, or metal alkoxides which could otherwise effect the polymerization of the separately constituted polymer blocks. Under these conditions, the conjugated diene generally polymerizes first, followed by the polymerization of the vinyl-substituted aromatic hydrocarbon.

In either process, it is preferred that the conjugated diene block polymerize first, followed by the vinyl substituted aromatic, positioning the living end of the polymerizing polymer on the vinyl aromatic block to facilitate later cross-linking.

Such diblock copolymers, formed by either method, are believed to aggregate to form micelle-like structures, with for example, the vinyl-substituted aromatic blocks directed toward the centers of the micelles and the conjugated diene blocks as tails extending therefrom. It is noted that a further hydrocarbon solvent charge or a decrease in polymerization mixture temperature may also be used, and may in fact be required, to obtain formation of the micelles. Moreover, these steps may be used to take advantage of the general insolubility of the vinyl-aromatic blocks. An exemplary temperature range for micelle formation is between about 50 and 80° C.

In a further embodiment, the polymer chains in solution can self-assemble into various structures. More than one polymer chains are covalently bonded to form nano-particles through one of various polymerization techniques, such as anionic polymerization, free radical polymerization, condensation polymerization, addition polymerization and emulsion polymerization. In another embodiment, the more than one polymer chains are covalently bonded to form nano-particles through a combination of various polymerization techniques, such as anionic polymerization, free radical polymerization, condensation polymerization, addition polymerization and emulsion polymerization. In either embodiment, the polymer chain may be functionalized prior to forming a micelle. In another embodiment, the functionalized polymer may be a monoblock polymer or multiblock polymer.

The polymerization may take place in an environment in which the formed polymeric chains may be placed in an environment at conditions which the thermodynamic nature of the polymer chains cause the polymer chains to form the nano-particle. In one embodiment, the forming of the polymer chains and the self-assembly into nano-particles takes place in the same environment.

The forming of the nano-particle may take place as an inherent aspect of the polymerization conditions or may be a second step. Preferably, the nano-particle has a core and a shell. The nano-particle may be functionalized after the formation of the nano-particle.

Figure 3:
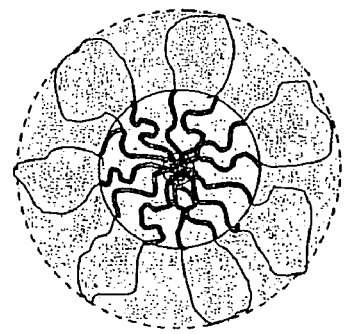
FIG. 3 is a nano-particle of the present invention in flower shape.
Figure 2:
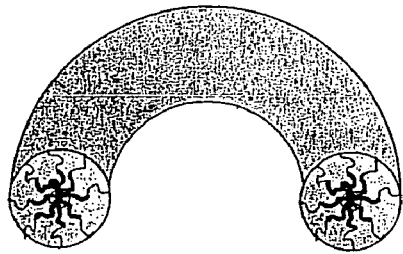
FIG. 2 is a nano-particle of the present invention in string shape.

The micelles can have various designs and shapes such as sphere (FIG. 1), string (FIG. 2), flower (FIG. 3), hollow (FIG. 4), ellipsoid, etc. Alternatively, the micelles may have uniform or random shapes, and uniform or random sizes. In one embodiment the shape may be predetermined. The predetermined shapes of the nano-particles may be controlled by: 1) varying the concentration of styrene and butadiene, 2) including a tri-block in the core or shell, and/or 3) varying the molecular weight of the polymers. For example, in one embodiment, the core can include a tri-block polymer represented by the formula:

S-B-S where S indicates a styrene block, and B represents a butadiene block. In another embodiment, the molecular weight is varied by increasing the ratio of butadiene to styrene, thus producing nano-particles with an ellipsoid shape.

In another embodiment, the polymer chains are extended. The chains may be extended by including a sufficient density of polymer chains such that interactions between the chains cause the chains to extend, at least partially, in a direction that may be described as at least somewhat radial from the center of the nano-particle, and/or somewhat parallel to the nearest polymer chains. In another embodiment, the shell includes at least partially extended polymer chains. In this embodiment, the chains are oriented such that the chains are at least somewhat orthogonal from the surface of the core from which they extend.

After the micelles have formed, additional conjugated diene monomer and/or vinyl-substituted aromatic hydrocarbon monomer can be added to the polymerization mixture as desired.

After formation of the micelles, a cross-linking agent is optionally added to the polymerization mixture. Preferably a crosslinking agent is selected which has an affinity to the vinyl-substituted aromatic hydrocarbon monomer blocks and migrates to the center of the micelles due to its compatibility with the monomer units and initiator residues present in the center of the micelle and its relative incompatibility with the dispersion solvent and monomer units present in the outer layer of the micelle. The crosslinking agent crosslinks the center core of the micelle (i.e. alkenylbenzene) to form the derived nano-particle. Consequently, nano-particles are formed from the micelles with a core including, for example, styrene monomer units and a surface layer including, for example, butadiene monomer units. The crosslinking of the core may be temporary or not temporary. The crosslink density in the core may vary according to needs. The core may optionally uncrosslinked after being crosslinked.

The polymer chain may optionally be hydrogenated. In one embodiment, the nano-particle is hydrogenated. In another embodiment, only the shell of the nano-particle is hydrogenated. Hydrogenation techniques that are known in the art may be used in the optional hydrogenation step.

The present inventive process is preferably initiated via addition of anionic initiators that are known in the art as useful in the copolymerization of diene monomers and vinyl aromatic hydrocarbons. Exemplary organo-lithium catalysts include lithium compounds having the formula $R(Li)_x$, wherein R represents a $C_1$-$C_{20}$ hydrocarbyl radical, preferably a $C_2$-$C_8$ hydrocarbyl radical and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, t-butyl, etc.

Specific examples of exemplary initiators include ethyllithium, propyllithium, n-butyllithium, sec-butyllithium, tert-butyllithium, and the like; aryllithiums, such as phenyl-lithium, tolyllithium, and the like; alkenyllithiums such as vinyllithium, propenyllithium, and the like; alkylene lithium such as tetramethylene lithium, pentamethylene lithium, and the like. Among these, n-butyllithium, sec-butyllithium, tert-butyllithium, tetramethylene lithium, and mixtures thereof are preferred.

Specific examples of other suitable lithium inititators include one or more of: p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

Anionic initiators generally are useful in amounts ranging from about 0.01 to 60 millimoles per hundred grams of monomer charge.

The conjugated diene monomers contemplated for the diblock polymer are those soluble in non-aromatic hydrocarbon solvents. $C_4$-$C_8$ conjugated diene monomers are the most preferred. Exemplary conjugated diene monomers include 1,3-butadiene, isoprene, and 1,3-pentadiene.

Vinyl-substituted aromatic hydrocarbon monomers include styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons.

The diblock polymer, preferably has $M_w$ of about 5,000 to 200,000, more preferably between about 10,000 and 100,000. A typical diblock polymer will be comprised of 10 to 90% by weight conjugated diene and 10 to 90% by weight vinyl-substituted aromatic hydrocarbon, more preferably 30 to 70% by weight, and most preferably 40 to 60% by weight of each contributed monomer type.

The micelle formed by the polymerization of vinyl-substituted aromatic hydrocarbons and conjugated diene monomers is preferably crosslinked to enhance the uniformity and permanence of shape and size of the resultant nano-particle. Preferred crosslinking agents are di- or tri-vinyl-substituted aromatic hydrocarbons. However, crosslinking agents which are at least bifunctional, wherein the two functional groups are capable of reacting with vinyl-substituted aromatic hydrocarbon monomers are acceptable. A preferred crosslinking agent is divinylbenzene (DVB).

Without being bound by theory, it is believed that an exemplary micelle will be comprised of ten to thirty diblock polymers yielding, after crosslinking, a nano-particle having a $M_w$ of between about 100,000 to 3,000,000, preferably between about 500,000 to 1,500,000.

A 1,2-microstructure controlling agent or randomizing modifier is optionally used to control the 1,2-microstructure in the conjugated diene contributed monomer units, such as 1,3-butadiene, of the nano-particle. Suitable modifiers include hexamethylphosphoric acid triamide, N,N,N',N'-tetramethylethylene idamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane. A mixture of one or more randomizing modifiers also can be used. The ratio of the modifier to the monomers can vary from a minimum as low as 0 to a maximum as great as about 400 millimoles, preferably about 0.01 to 3000 millimoles, of modifier per hundred grams of monomer currently being charged into the reactor. As the modifier charge increases, the percentage of 1,2-microstructure (vinyl content) increases in the conjugated diene contributed monomer units in the surface layer of the polymer nano-particle. The 1,2-microstructure content of the conjugated diene units is preferably between about 5% and 95%, and preferably greater than about 35%.

Figure 4:
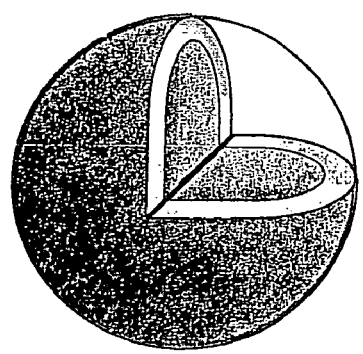
FIG. 4 is a nano-particle of the present invention in hollow shape.

Concerning nano-particles that have a shell-core orientation, after formation of the nano-particles, either the shell or the core can then be partially, substantially, or completely removed using means known in the art. In one embodiment, the removal of the shell or core is by monomerization of the core or shell using osmium tetroxide and heat. In one embodiment the core is at least partially monomerized, resulting in a hollow nano-particle (FIG. 4). In another embodiment, the shell is at least partially removed, resulting in a low-shell or a no-shell nano-particle.

After the polymer nano-particles have been formed, they may be blended with a rubber to improve the physical characteristics of the rubber composition. Nano-particles are useful modifying agents for rubbers because they are discrete particles which are capable of dispersing uniformly throughout the rubber composition, resulting in uniformity of physical characteristics. Furthermore, the present polymer nano-particles are advantageous because the surface layer of poly (conjugated diene), especially vinyl-modified poly (conjugated diene), is capable of bonding with the rubber matrix due to the accessibility of the pendant vinyl groups.

The present polymer nano-particles are suitable for modifying a variety of rubbers including, but not limited to, random styrene/butadiene copolymers, butadiene rubber, poly (isoprene), nitrile rubber, polyurethane, butyl rubber, EPDM, and the like. Advantageously, the nano-particles demonstrate improved tensile and tear strength of at least about 30% over non-spherical copolymers. Used in a rubber, the nano-particles also demonstrate improved fading characteristics and improved traction. In addition, the particles can be used as a host for other inorganic materials such as nano-composites. The rubber may be extended using techniques known in the art.

One application for such rubber compounds is used in tire rubber formulations. Specifically, they are contemplated for use in rubber compounds used to make tire treads and side walls.

The present invention now will be described with reference to non-limiting examples. The following examples and tables are presented for purposes of illustration only and are not to be construed in a limiting sense.

EXAMPLES

Preparation of Polymers

A 7.6 L reactor equipped with external jacked heating and internal agitation was used for all polymerizations. 1,3-Butadiene was used as a 22.0 or 21.1 weight percent solution in hexane. Styrene was used as a 33.0 wt. % solution in hexane, and n-butyllithium was used as a 15 wt % solution in hexane. The antioxidant butylated hydroxytoluene (BHT, Aldrich Chem. Co., Milwaukee, Wis.) was used as an approximately 17 wt % solution in hexane. Technical grade divinylbenzene (DVB, 80% as a mixture of isomers, Aldrich) was passed through a column of inhibitor remover under $N_2$ before use. Neat bis-oxalanyl propane (OOPs, Aldrich) was similarly treated and used as a 1.6M solution in hexane, stored over calcium hydride.

Example 1

Preparation of Diblock Polymers

The reactor was charged with 1.03 kg of 22% butadiene, 0.55 kg hexane, and 0.70 kg styrene (33 wt %). The batch was heated to 57° C., followed by initiation of polymerization with 5.0 mL n-BuLi (1.6 M) diluted in 30 mL hexane. The temperature was maintained at 57° C. for the duration of the polymerization.

Particle Formation:

Following the diblock polymer preparation, the reactor jacket was set to 26° C. The reactor was charged with 1.36 kg styrene (33 wt %) diluted with an additional 0.90 kg hexane, followed by 50 mL DVB containing 1.0 mL OOPs. The reactor jacket was set to 50° C. The exotherm peaked at 54° C. about 30 minutes after the addition of the DVB/OOPs mixture. About half of the batch was dropped into dried, Nz purged bottles, and polymerization was terminated with about 1 mL isopropanol and treated with about 3 mL BHT solution. For transmission electron microscopy (TEM) analysis, about 10 mL of solution was taken from the batch and further diluted with the hexane solvent to about $10^{-4}$ wt %. A drop of the diluted solution was then deposited on a formvar-carbon coated micro-grid. After the solvent was evaporated, the grid was stained with $OsO_4$, and then examined by TEM. The results showed that the average particle diameter was about 50 nm with dispersity of about 1.1.

Example 2

The diblock polymer was prepared as described above. Particle formation was also performed as described above, except 1.22 kg of styrene (33 wt %) 1.0 kg hexane, and 100 mL of DVB containing 1.0 mL of OOPs solution was used. The jacket temperature was raised to 57° C., then 65° C. overnight because no exotherm was observed. Half of the batch was dropped into bottles and terminated as described above. The particles constituted about 18% by weight of the mixture. To the remainder of the batch was added 2.27 kg of 21.6% butadiene, but no polymerization occurred. Further polymerization was initiated with a charge of 2.5 mL of n-BuLi (1.6 M solution) and the batch subsequently gelled.

Example 3

The dispersant was prepared as described above, except 1.8 kg of butadiene (22 wt %) was used. The living dispersant was diluted with 0.91 kg hexane, and a solution of 0.453 kg DVB in 0.91 kg hexane was charged into the reactor. The reactor temperature control was switched from batch control at 57° C. to jacket at 57° C. After about 4 hours, the batch was dropped into bottles and terminated as described above. The particles constituted about 11% by weight of the mixture. The GPO analysis showed that the particle had a $M_n$ of about 976,000. The polydispersity of the molecular weight was 1.11. The nano-particles were examined by TEM and had an average particle size of about 15 nm, and a dispersity of particle size of about 1.1.

Application of the Particles in Rubber Compounds

Four kinds of rubber compositions were prepared according to the formulation shown in Tables 1 and 2 by selectively using the synthesized particles to replace the amount of polymer (polybutadiene) in the compound formulation. The physical details of these compositions are shown in Table 3. Two controls were used (Examples 4 and 5) to provide a comparison with the test compounds (Examples 6 and 7) wherein the nano-particles were derived from Example 3. In each sample, a blend of the ingredients was kneaded by the method described in Table 4. The final stock was sheeted and molded at 160° C. for 30 minutes.

The physical characteristics of the rubber compounds shown in Table 3 were measured by accepted standards in the art. The tensile strength measurements were based on conditions of ASTM-D 412 at 22° C. Test specimen geometry was taken in the form of a ring of a width of 0.127 cm and of a thickness of 0.197 cm. The specimen was tested at a specific gauge length of 2.54 cm. The measurement of tear strength was based on conditions of ASTM-D 624 at 170° C. Test specimen geometry was taken in the form of a nicked ring (ASTM-624-C). The specimen was tested at the specific gauge length 11.29 cm. The hysteresis loss was measured with a Dynastat Viscoelastic Analyzer. Test specimen geometry was taken in the form of a strip of a length of 30 mm and of a width of 15 mm. A frequency of 5 Hz at 2% strain was employed. Measurement of the wet traction was performed on the British Portable Skid Tester. The sample geometry for the test was a rectangular bar of 2.54×7.6×0.64 cm.

As seen in Table 3, the rubber compositions of Examples 6 and 7 exhibit balanced physical properties. The tensile strength and tear strength of the modified rubber compounds are ~30% better than those of the comparative compounds at equal modulus.

TABLE 1

Composition of Master Batch

| Component | Concentration (pbw) |
| --- | --- |
| Rubber | 100 |
| Carbon black | 50 |
| Aromatic oil | 15 |
| Zinc oxide | 3 |
| Hydrocarbon resin (tackifiers) | 2 |
| Antioxidants | 0.95 |
| Stearic Acid | 2 |
| Wax | 1 |

TABLE 2

Composition for Final Batch

| Component | Concentration (pbw) |
| --- | --- |
| Sulfur (curing agent) | ~1.30 |
| Cyclohexyl-benzothiazole sulfenamide (accelerator) | 1.4 |
| Diphenylguanidine (accelerator) | .2 |

TABLE 3

Physical Characteristics of Rubber Formulations

| Example | 4 | 5 | 6 | 7 |
|---|---|---|---|---|
| Nano-particle (pbw) | 0 | 0 | 10 | 10 |
| Butadiene rubber (pbw) | 100 | 100 | 90 | 90 |
| Carbon black (pbw) | 50 | 50 | 50 | 50 |
| Aromatic oil (pbw) | 15 | 15 | 15 | 15 |
| Sulfur (pbw) | 1.3 | 1.9 | 1.4 | 1.6 |
| Mooney Viscosity | 89.2 | 86.8 | 82.98 | 82.9 |
| CB Dispersion index | 96.3 | 97.2 | 99 | 98.5 |
| Shore A | | | | |
| 22° C. (3 sec) | 64.1 | 66.4 | 67.2 | 68.3 |
| 100° C. (3 sec) | 62.7 | 64.6 | 63.3 | 64.9 |
| Ring Tensile (23° C.) | | | | |
| Tb (kPa) | 12,786 | 13,158 | 16,598 | 13,138 |
| Eb (%) | 444 | 373 | 502 | 382 |
| Tb*Eb (breaking energy) | 5,676,984 | 4,907,934 | 8,332,196 | 5,018,716 |
| Modulus at 300% Elongation (psi) | 988 | 1242 | 1116 | 1334 |
| Modulus at 50% Elongation (psi) | 188 | 219 | 215 | 240 |
| Ring Tear (170° C.) | | | | |
| Strength (kg/cm) | 33.5 | 27.8 | 39.7 | 37.2 |
| Travel (%) | 320 | 175 | 358 | 291 |
| $T_g$ (° C.) | −76 | −75 | −76 | −75 |
| Temp Sweep (2% strain) | | | | |
| tan δ @ 50° C. | 0.1343 | 0.1171 | 0.1721 | 0.1695 |
| tan δ @ 20° C. | 0.1559 | 0.1422 | 0.1874 | 0.1881 |
| tan δ @ 0° C. | 0.1698 | 0.1598 | 0.1961 | 0.2002 |

TABLE 4

Mixing Conditions

| Mixer | 300 g Brabender |
|---|---|
| Agitation Speed | 60 rpm |
| Master Batch Stage | |
| Initial Temperature | 110° C. |
| 0 minutes | Charging polymers |
| 0.5 minutes | Charging oil and carbon black |
| 5.0 minutes | Drop |
| Final Batch Stage | |
| Initial Temperature | 75° C. |
| 0 seconds | Charging master stock |
| 30 seconds | Charging curing agent |
| 75 seconds | drop |

The invention has been described with reference to the exemplary embodiments. Modifications and alterations will occur to others upon reading and understanding the specification. The invention is intended to include such modifications and alterations insofar as they come within the scope of the disclosure and claims.

We claim:

1. A method of making a nano-particle comprising;
forming di-block polymer chains by living anionic polymerization;
aggregating the di-block polymer chains into one or more nano-particles in a hydrocarbon solvent, through micelle formation, whereby a mean average diameter of the nano-particle comprises no more than about 100 nm.

2. The method of claim 1, further comprising functionalizing said polymer chains.

3. The method of claim 1, further wherein an orientation of said nano-particle comprises a shell-core orientation.

4. The method of claim 3, further comprising crosslinking the core with a cross-linking agent.

5. The method of claim 3, further comprising crosslinking the shell with a cross-linking agent.

6. The method of claim 1, further comprising extending said polymer chains.

7. The method of claim 6, wherein the extending comprises increasing the density of the shell.

8. The method of claim 1, wherein said aggregating comprises forming said nano-particles from said polymer chains in an environment which initiates the polymer chains.

9. The method of claim 4, further comprising uncrosslinking said core.

10. The method of claim 5, further comprising uncrosslinking said shell.

11. The method of claim 1, further comprising hydrogenating said polymer chain.

12. The method of claim 1, further comprising hydrogenating said nano-particle.

13. The method of claim 1, wherein said aggregating and said forming occur in the same environment.

14. The method of claim 3 further comprising at least partial removal of the shell or the core.

15. The method of claim 14, wherein said removal comprises monomerization of the core or shell with Osmium tetraoxide and heat.

16. The method of claim 1, wherein the nanoparticle is formed into a shape selected from the group consisting of: spherical, string, flower, hollow, and ellipsoid.

17. A nano-particle formed from aggregating diblock polymer chains through micelle formation in a hydrocarbon solvent, the one or more diblock polymer chains comprising a core, and a shell, and a mean average diameter of no more than about 100 nm;
wherein the one or more polymer chains are formed by living anionic polymerization.

18. The nano-particle of claim 17, wherein the shell comprises extended polymer chains.

19. A method of making a nano-particle comprising:
forming diblock polymer chains by living anionic polymerization;
in a hydrocarbon solvent, aggregating the diblock polymer chains into one or more nano-particles, through micelle formation, and cross-linking the nano-particle with a cross-linking agent.

20. The method of claim 19, wherein an orientation of the nano-particle comprises a shell-core orientation.

21. The method of claim 19, wherein the nanoparticle is formed into a shape selected from the group consisting of: spherical, string, flower, hollow, and ellipsoid.

22. The method of claim 3, wherein the core comprises poly(alkenyl)benzene monomer units and the shell comprises conjugated diene monomer units.

23. The method of claim 3, wherein the core is harder than the shell.

24. The method of claim 3, wherein the shell includes pendent vinyl groups.

25. A method of making a nano-particle composition comprising the steps of:
forming diblock polymer chains by anionic polymerization;
aggregating the diblock polymer chains into one or more core-shell oriented nano-particles in a hydrocarbon solvent, through micelle formation, and
combining the one or more nano-particles with a rubber matrix.

26. The method of claim 25 further comprising the step of forming the nano-particle composition into a tire tread or tire side wall.

27. The method of claim 25, wherein the core comprises poly(alkenyl)benzene monomer units and the shell comprises conjugated diene monomer units.

28. The method of claim 27, wherein the core is harder than the shell.

29. A tire component comprising a nano-particle composition formed by the process comprising:
forming diblock polymer chains by living anionic polymerization;
aggregating the diblock polymer chains into one or more core-shell oriented nano-particles in a hydrocarbon solvent, through micelle formation,
combining the one or more nano-particles with a rubber matrix to form a rubber matrix and nano-particle composition;
curing the rubber matrix and nano-particle composition;
molding the cured rubber matrix and nano-particle composition into a tire component.

30. The tire component of claim 29, wherein the core of the one or more nanoparticles comprises poly(alkenyl)benzene monomer units and the shell comprises conjugated diene monomer units.

31. The tire component of claim 30, wherein the core of the one or more nanoparticles is harder than the shell.

* * * * *